(12) United States Patent
Nakamura

(10) Patent No.: US 9,097,322 B2
(45) Date of Patent: Aug. 4, 2015

(54) ECCENTRIC OSCILLATING GEAR DEVICE AND ASSEMBLING METHOD FOR CRANKSHAFT IN ECCENTRIC OSCILLATING GEAR DEVICE

(71) Applicant: NABTESCO CORPORATION, Tokyo (JP)

(72) Inventor: Koji Nakamura, Tsu (JP)

(73) Assignee: NABTESCO CORPORATION (JP)

( * ) Notice: Subject to any disclaimer, the term of this patent is extended or adjusted under 35 U.S.C. 154(b) by 0 days.

(21) Appl. No.: 14/178,599

(22) Filed: Feb. 12, 2014

(65) Prior Publication Data

US 2014/0171250 A1    Jun. 19, 2014

Related U.S. Application Data

(62) Division of application No. 13/375,335, filed as application No. PCT/JP2010/003614 on May 28, 2010, now Pat. No. 8,684,879.

(30) Foreign Application Priority Data

Jun. 15, 2009    (JP) ................................. 2009-142496

(51) Int. Cl.
*F16H 1/32*    (2006.01)
*F16H 3/70*    (2006.01)

(52) U.S. Cl.
CPC .. *F16H 3/70* (2013.01); *F16H 1/32* (2013.01); *F16H 2001/323* (2013.01); *Y10T 29/49464* (2015.01)

(58) Field of Classification Search
CPC ...... F16H 3/70; F16H 3/132; F16H 2001/323
USPC ......... 475/179, 163, 162, 168, 331, 344, 178, 475/346
See application file for complete search history.

(56) References Cited

U.S. PATENT DOCUMENTS 5,989,144 A * 11/1999 Chen et al. ..................... 475/168
6,231,469 B1 * 5/2001 Wang et al. ................... 475/178
(Continued)

FOREIGN PATENT DOCUMENTS

JP            59-42347            3/1984
JP            2001-353684         12/2001
(Continued)

OTHER PUBLICATIONS

International Search Report of Aug. 19, 2010.
(Continued)

*Primary Examiner* — David J Hlavka
(74) *Attorney, Agent, or Firm* — Gerald E. Hespos; Michael J. Porco; Matthew T. Hespos

(57) ABSTRACT

An eccentric oscillating gear device comprises a crankshaft 46 having an eccentric portion 46a, 46b, an externally toothed gear 48a, 48b having external teeth and a through-hole in which the eccentric portion 46a, 46b is inserted, an outer cylinder 12, and a carrier 14. The carrier 14 rotatably supports the crankshaft 46. The outer cylinder 12 has internal teeth 24 meshed with the external teeth of the externally toothed gear. The eccentric oscillating gear device is provided with rotational phase adjusting means 58 for setting an orientation of the crankshaft 46 about an axis thereof, on the basis of orientations of the outer cylinder 12 and the carrier 14 about an axis thereof.

7 Claims, 5 Drawing Sheets

(56) References Cited

U.S. PATENT DOCUMENTS

| | | | |
|---|---|---|---|
| 7,056,253 B2 * | 6/2006 | Tsurumi et al. | 475/162 |
| 7,351,177 B2 * | 4/2008 | Christ | 475/168 |
| 7,476,174 B2 * | 1/2009 | Fujimoto | 475/177 |
| 7,819,770 B2 * | 10/2010 | Haga et al. | 475/176 |
| 8,117,945 B2 * | 2/2012 | Nakamura | 74/640 |
| 8,568,264 B2 * | 10/2013 | Yamamoto et al. | 475/162 |
| 2002/0066331 A1 | 6/2002 | Okada et al. | |
| 2003/0054912 A1 * | 3/2003 | Nohara et al. | 475/162 |
| 2008/0207377 A1 | 8/2008 | Tsurumi et al. | |
| 2010/0179013 A1 | 7/2010 | Nakamura | |

FOREIGN PATENT DOCUMENTS

| | | |
|---|---|---|
| JP | 2004-138094 | 5/2004 |
| JP | 2007247730 | 9/2007 |

OTHER PUBLICATIONS

Office Action of Mar. 1, 2013.
Office Action of Jun. 19, 2013.
Notice of Allowance and Notice of Allowability of Nov. 20, 2013.
Japanese Office Action—Jul. 8, 2014.

* cited by examiner

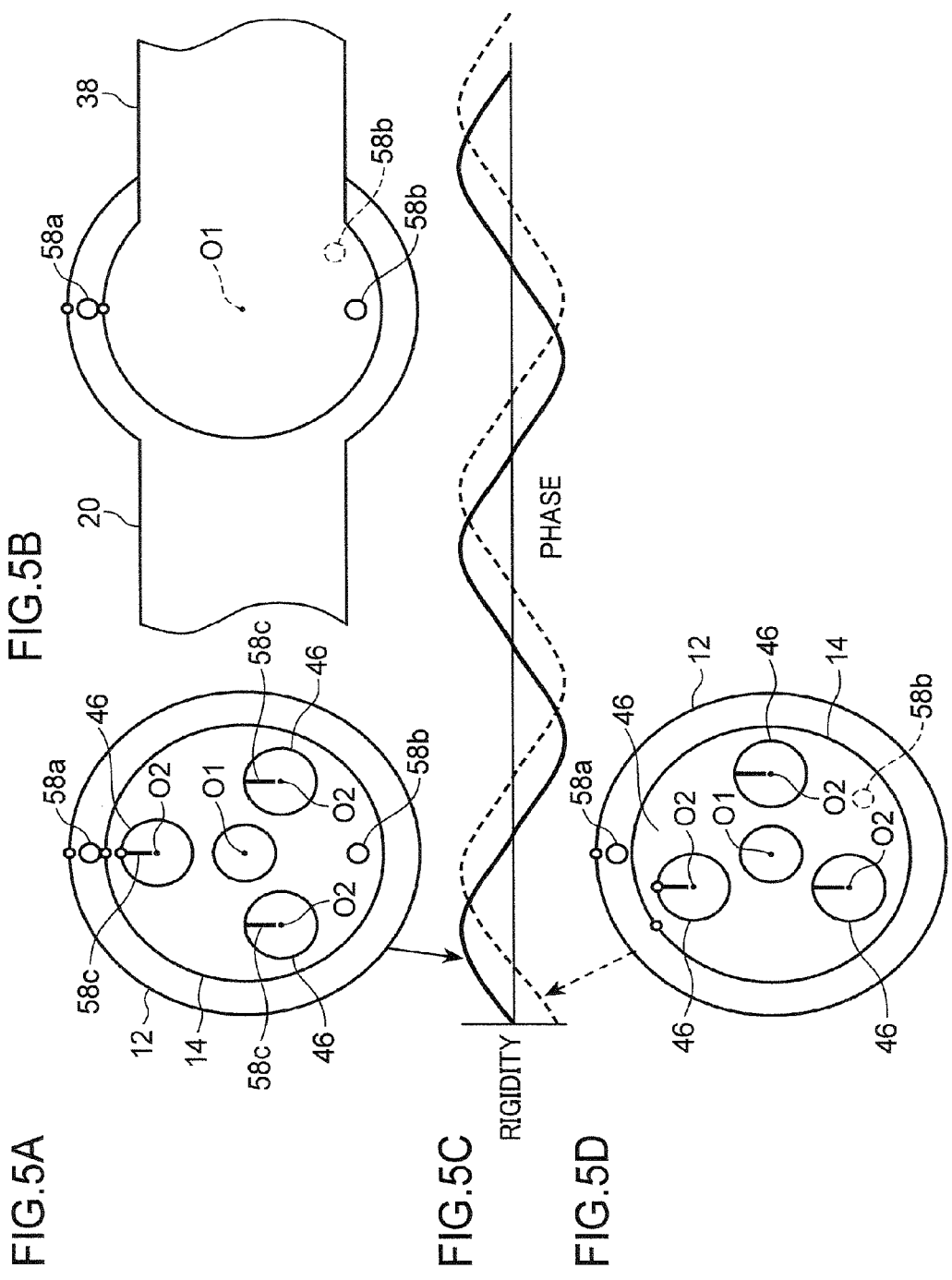

ECCENTRIC OSCILLATING GEAR DEVICE AND ASSEMBLING METHOD FOR CRANKSHAFT IN ECCENTRIC OSCILLATING GEAR DEVICE

PRIORITY

The present application is a divisional application of U.S. patent application Ser. No. 13/375,335, filed Nov. 30, 2011, the contents of which are hereby incorporated by reference in their entirety.

BACKGROUND OF THE INVENTION

1. Field of the Invention

The present invention relates to an eccentric oscillating gear device, and a method of assembling a crankshaft in the eccentric oscillating gear device.

2. Description of the Related Art

Heretofore, there has been known an eccentric oscillating gear device disclosed in JP 2001-353684A. The eccentric oscillating gear device disclosed in JP 2001-353684A is designed such that an externally toothed gear is oscillatingly rotated interlockingly with a rotation of an eccentric body provided on a crankshaft, to allow an outer cylinder and a carrier to be relatively rotated with respect to each other. In this gear device, the outer cylinder is fixed to a first member of a robot, and the carrier is adapted to be relatively rotated at a given rotation ratio with respect to the outer cylinder, and fixed to a second member of the robot. This gear device is provided with a positioning pin for setting the carrier to a given orientation with respect to the second member of the robot.

Meanwhile, in an operation of assembling an eccentric oscillating gear device, generally, a crankshaft and an externally toothed gear are assembled to a carrier, and then the carrier is assembled to an outer cylinder. In this case, the crankshaft can be assembled to the carrier without any restriction in terms of an eccentric direction of an eccentric body of the crankshaft. However, depending on the eccentric direction of the assembled crankshaft, a rotational phase difference occurs in torsional rigidity of the gear device. This causes a problem that, in cases where the gear device is disassembled during maintenance or the like and then re-assembled, a phase of the torsional rigidity in a rotation direction is changed from that before the disassembling. Moreover, the gear device is free from restriction in terms of the eccentric direction. Thus, there is another problem that an individual difference in phase of the torsional rigidity in the rotation direction occurs between respective ones of a plurality of the gear devices.

SUMMARY OF THE INVENTION

It is an object of the present invention to provide an eccentric oscillating gear device capable of solving the above problems, and a method of assembling a crankshaft in the eccentric oscillating gear device.

More specifically, the present invention is directed to reducing a variation in phase of torsional rigidity of an eccentric oscillating gear device in a rotation direction.

According to one aspect of the present invention, there is provided an eccentric oscillating gear device for transmitting driving force while changing a rotation speed at a given rotation speed ratio between a first member and a second member. The gear device comprises a crankshaft having an eccentric portion, a gear member having a tooth portion and a through-hole in which the eccentric portion is inserted, a first cylindrical section adapted to be attachable to one of the first and second members, and a second cylindrical section adapted to be attachable to a remaining one of the first and second members. One of the first and second cylindrical sections rotatably supports the crankshaft, and a remaining one of the first and second cylindrical sections has a tooth portion meshed with the tooth portion of the gear member. The first and second cylindrical sections are adapted to be rotatable concentrically and relatively with respect to each other according to an oscillating movement of the gear member along with a rotation of the crankshaft. The eccentric oscillating gear device is provided with rotational phase adjusting section for setting an orientation of the crankshaft about an axis thereof, on the basis of orientations of the first and second cylindrical sections about an axis thereof.

According to another aspect of the present invention, there is provided a method of assembling a crankshaft in an eccentric oscillating gear device for transmitting driving force while changing a rotation speed at a given rotation speed ratio between a first member and a second member. The crankshaft assembling method comprises the steps of: assembling a crankshaft having an eccentric portion to a gear member; assembling the crankshaft to one of a first cylindrical section and a second cylindrical section; assembling the gear member to a remaining one of the first and second members which has a tooth portion; and combining the first and second cylindrical sections together. In the crankshaft assembling method, the step of assembling the crankshaft to one of a first cylindrical section and a second cylindrical section includes using rotational phase adjusting section to set an orientation of the crankshaft about an axis thereof, with respect to one of the first and second cylindrical sections, and the step of combining the first and second cylindrical sections together includes using the rotational phase adjusting section to set an orientation of the second cylindrical section about an axis thereof, with respect to the first cylindrical section.

BRIEF DESCRIPTION OF THE DRAWINGS

FIGS. 5A to 5D are diagrams illustrating a rotational phase.

DETAILED DESCRIPTION OF THE PREFERRED EMBODIMENTS

With reference to the drawings, the present invention will now be specifically described based on one embodiment thereof.

Figure 1:
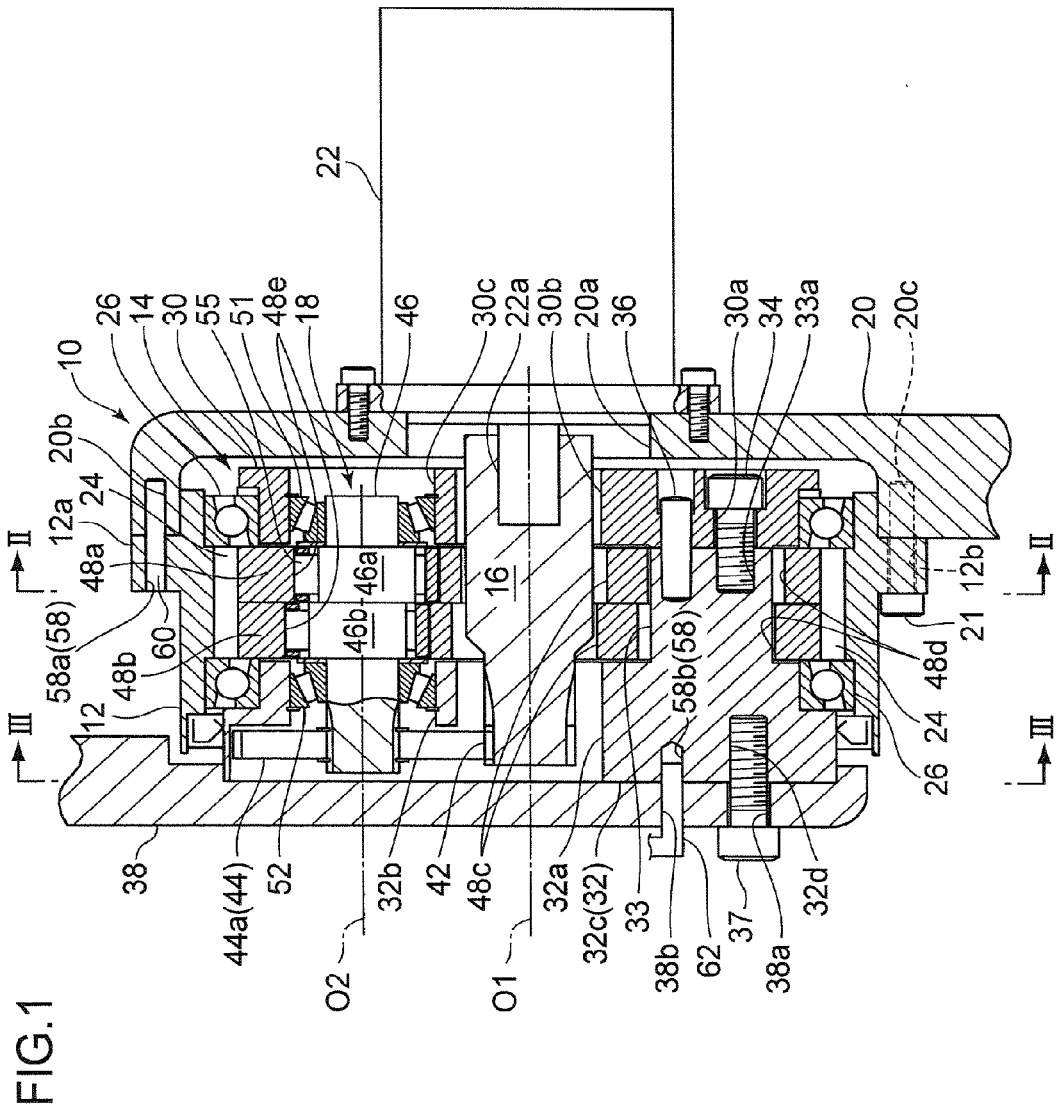
FIG. 1 is a sectional view of an eccentric oscillating gear device according to one embodiment of the present invention.

As illustrated in FIG. 1, an eccentric oscillating gear device 10 according to this embodiment comprises: an outer cylinder 12 serving as a first cylindrical section; a carrier 14 disposed inside the outer cylinder 12 to serve as a second cylindrical section adapted to be relatively rotatable with respect to the outer cylinder 12; an input shaft 16 adapted to generate a rotational driving force for rotating the carrier 14; and a speed reduction mechanism 18 adapted to rotate the carrier 14 at a rotation speed reduced at a given ratio with respect to a rotation speed of the input shaft 16. The gear device 10 is designed to transmit driving force while changing a rotation speed at a given rotation speed ratio, between a first arm 20 serving as a first member, and a second arm 38 serving as a second member. For example, the gear device 10 is configured as a speed reducer for use in an articulated joint for robot arms.

Figure 2:
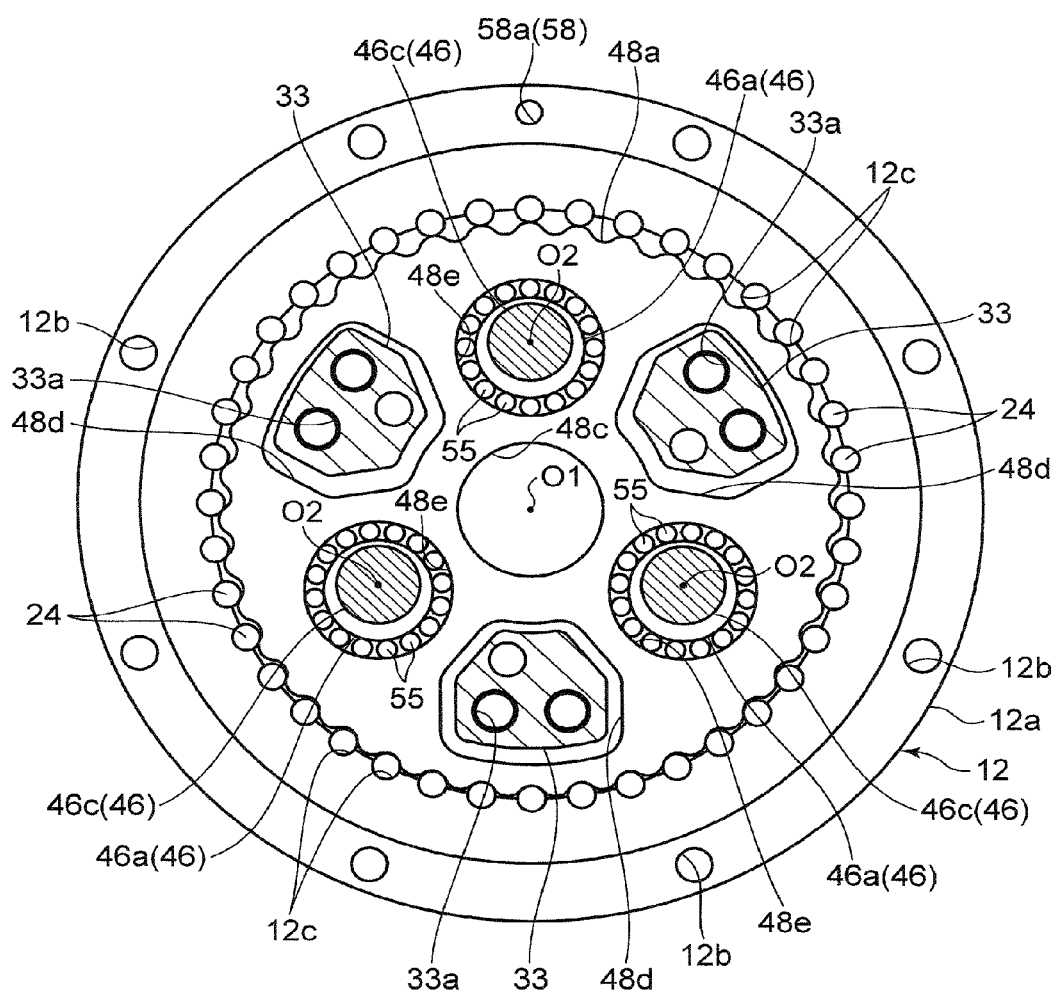
FIG. 2 is a sectional view taken along the line II-II in FIG. 1.

The outer cylinder 12 is formed in a cylindrical shape, and an inner peripheral surface of the outer cylinder 12 has a large number of pin grooves 12c formed at even intervals in a circumferential direction thereof. As also illustrated in FIG. 2, a pin-shaped internal tooth 24 is fitted in each of the pin grooves 12c. In other words, in this embodiment, the outer cylinder 12 serving as the first cylindrical section has internal teeth 24.

The outer cylinder 12 has an outer peripheral portion integrally provided with a flange 12a. The flange 12a has a plurality of bolt-insertion holes 12b provided at even intervals in a circumferential direction thereof. In this embodiment, the bolt-insertion hole 12b is provided in a number of eight. The outer cylinder 12 and the first arm 20 are fastened together by inserting a plurality of bolts 21 in respective ones of the bolt-insertion holes 12b, and screwing the inserted bolts 21 with respective ones of a plurality of screw holes 20c of the first arm 20. One of axially opposite ends (in FIG. 1, a right end) of the outer cylinder 12 is closed by the first arm 20. A motor 22 serving as a driving source is fixed to the first arm 20 which has a drive-shaft insertion hole 20a formed to penetrate therethrough in a thickness direction thereof so as to allow a drive shaft 22a of the motor 22 to be inserted thereinto.

The carrier 14 is supported by the outer cylinder 12 through a pair of main bearings 26 disposed in axially spaced-apart relation. Thus, the carrier 14 is adapted to be rotatable concentrically with the outer cylinder 12. In other words, the carrier 14 is adapted to be rotated about an axis O1 of the outer cylinder 12 and relatively with respect to the outer cylinder 12. Each of the main bearings 26 is composed of an angular ball bearing.

The carrier 14 comprises a circular disk-shaped end plate portion 30 serving as a first side portion, a circular disk-shaped base plate portion 32 serving as a second side portion, and a shaft portion 33 protrudingly provided on one surface of the base plate portion 32. The shaft portion 33 is integrally formed with the base plate portion 32. As illustrated in FIG. 2, the shaft portion 33 has a generally hexagonal shape in cross-section. In this embodiment, the shaft portion 33 is provided in a number of three, wherein the three shaft portions 33 are arranged at even intervals in a circumferential direction of the base plate portion 32. After a distal end face of the shaft portion 33 is brought into contact with the end plate portion 30, the shaft portion 33 is fastened to the end plate portion 30 by a bolt 34. In this state, a space having a given width in the axial direction is defined between the base plate portion 32 and the end plate portion 30.

The shaft portion 33 is provided with a bolt-fastening hole 33a. The bolt 34 is inserted into a bolt-insertion hole 30a of the end plate portion 30 from a side opposite to the shaft portion 33, and screwed with the bolt-fastening hole 33a of the shaft portion 33. Further, a pin 36 is provided to extend between the shaft portion 33 and the end plate portion 30 so as to position the end plate portion 30 with respect to the base plate portion 32. Instead of being integrally formed with the base plate portion 32, the shaft portions 33 may be integrally formed with the end plate portion 30. In this case, the shaft portions 33 will be fastened to the base end portion 32.

The base end portion 32 is attached to the second arm 38 as a counterpart member, through an end face 32c thereof on a side opposite to the end plate portion 30. The second arm 38 is formed with a plurality of bolt-insertion holes 38a, and the base plate portion 32 has a plurality of fastening holes 32d formed at positions corresponding to respective ones of the bolt-insertion holes 38a. The second arm 38 and the base plate portion 32 are fastened together by inserting a plurality of bolts 37 in respective ones of the bolt-insertion holes 38a of the second arm 38, and screwing the inserted bolts 37 with respective ones of the fastening holes 32d of the base plate portion 32. Two or more (five) of the fastening holes 32d are disposed at even intervals to form a fastening-hole group. The fastening-hole group is provided in a number of three, wherein the three fastening-hole groups are disposed about the axis O1 at even intervals (see FIG. 3).

As illustrated in FIG. 1, the end plate portion 30 and the base plate portion 32 are formed, respectively, with a through-hole 30b and a through-hole 32a each penetrating through a central region thereof in the axial direction. Each of the through-holes 30b, 32a is adapted to allow the input shaft 16 to be inserted thereinto. The input shaft 16 is inserted in the through-holes 30b, 32a and disposed coaxially with the outer cylinder 12.

The input shaft 16 has a base end coaxially joined to the drive shaft 22a of the motor 22, and a distal end located within the through-hole 32a of the base plate portion 32. The distal end of the input shaft 16 is integrally provided with a drive gear 42 composed of an externally toothed gear.

The speed reduction mechanism 18 comprises spur gears 44, crankshafts 46, and externally toothed gears (a first externally toothed gear 48a and a second externally toothed gear 48b) serving as gear members. Each of the first and second externally toothed gears 48a, 48b has external teeth meshed with the internal teeth of the outer cylinder 12. The spur gear 44 is splined to a base plate portion-side end of the crankshaft 46, and meshed with the drive gear 42 provided on the input shaft 16. Thus, driving force is transmitted to the crankshaft 46 through the spur gear 44, so that the crankshaft 46 is interlocked with a rotation of the input shaft 16.

The crankshaft 46 is disposed parallel to the input shaft 16. The crankshaft 46 is rotatably supported by the end plate portion 30 through a first crankshaft bearing 51, and rotatably supported by the base plate portion 32 through a second crankshaft bearing 52. In other words, the first crankshaft bearing 51 is disposed between the end plate portion 30 and the crankshaft 46, and the second crankshaft bearing 52 is disposed between the base plate portion 32 and the crankshaft 46. Each of the first and second crankshaft bearings 51, 52 is composed of a tapered roller bearing.

The end plate portion 30 and the base plate portion 32 are formed with a through-hole 30c and a through-hole 32b, respectively. The through-hole 30c (32b) is formed in a number of three, wherein the three through-holes 32c (32b) are arranged around the through-hole 30b (32a) at even intervals in a circumferential direction. The crankshaft 46 is provided in a number of three, wherein the three crankshafts 46 are disposed at even intervals in the circumferential direction (see FIG. 2), while penetrating through respective paired ones of the through-holes 30c, 32b.

The crankshaft 46 has a shaft body 46c, and eccentric portions (a first eccentric portion 46a and a second eccentric portion 46b) integrally formed on the shaft body 46c. The shaft body 46c has a cross-sectionally circular shape, and each of the first and second eccentric portions 46a, 46b is eccentrically disposed with respect to a crankshaft axis O2 which is an axis of the shaft body 46c. The first and second eccentric portions 46a, 46b are shifted in phase angle with respect to each other. Specifically, an eccentric direction of the first eccentric portion 46a with respect to the crankshaft axis O2 and an eccentric direction of the second eccentric portion 46b with respect to the crankshaft axis O2 are different from each other, and the respective phase angles of the first and second eccentric portions 46a, 46b are shifted in phase angle by 180 degrees. The three crankshafts 46 are assembled to allow respective eccentric directions of the first eccentric portions 46a thereof to coincide with each other.

The first and second eccentric portions 46a, 46b are disposed between the first and second crankshaft bearings 51, 52 in axially adjacent relation to each other. The first eccentric portion 46a is disposed adjacent to the first crankshaft bearing 51, and the second eccentric portion 46b is disposed adjacent to the second crankshaft bearing 52.

Each of the first externally toothed gear 48a and the second externally toothed gear 48b is disposed within the space between the base plate portion 32 and the end plate portion 30. As also illustrated in FIG. 2, each of the first and second externally toothed gears 48a, 48b is formed with a first through-hole 48c for allowing the input shaft 16 to penetrate therethrough, a second through-hole 48d for allowing each of the shaft portions 33 to penetrate therethrough, and a third through-hole 48e for allowing the first and second eccentric portions 46a, 46b of each of the crankshafts 46 to penetrate therethrough.

A roller bearing 55 is attached to each of the first and second eccentric portions 46a, 46b. In this state, the first eccentric portion 46a is inserted in the third through-hole 48e of the first externally toothed gear 48a, and the second eccentric portion 46b is inserted in the third through-hole 48e of the second externally toothed gear 48b. According to oscillating movements of the first and second eccentric portions 46a, 46b along with a rotation of the crankshaft 46, the first and second externally toothed gears 48b are rotated while being meshed with the internal teeth 24 of the outer cylinder 12. In this embodiment, the gear device is designed such that the externally toothed gear is provided in a number of two. Alternatively, the gear device may be designed such that the externally toothed gear is provided in a number of one or in a number of three or more.

Figure 3:
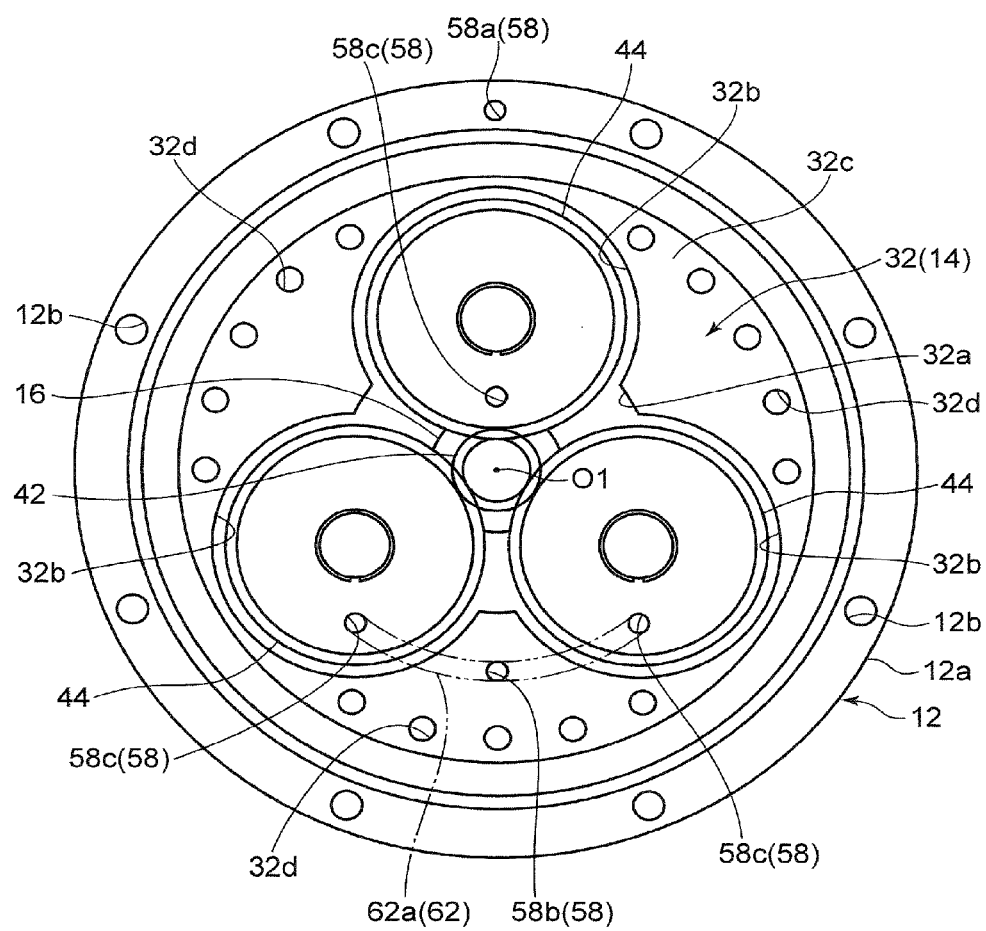
FIG. 3 is a view from the line III-III in FIG. 1.

As illustrated in FIGS. 1 and 3, the through-hole 32a and the three through-holes 32b of the base plate portion 32 are communicated with each other, i.e., formed as a single through-hole, in the end face 32c on the side opposite to the end plate portion 30. The spur gear 44 is located within the single through-hole at a position corresponding to each of the through-holes 32b. Thus, when the base plate portion 32 is detached from the second arm 38, one principal surface 44a of the spur gear 44 is exposed.

As illustrated in FIG. 3, the eccentric oscillating gear device 10 is provided with rotational phase adjusting means 58 for setting an orientation of the crankshaft 46 about the axis thereof, on the basis of orientations of the outer cylinder 12 and the carrier 14 about the axis thereof. The rotational phase adjusting means 58 comprises a first reference portion 58a, a second reference portion 58b and a third reference portion 58c.

The first reference portion 58a is provided in the outer cylinder 12 at a given position offset from the axis O1. In this embodiment, the first reference portion 58a is composed of a hole formed in the flange 12a of the outer cylinder 12. The first reference portion 58a is provided in a number of one, wherein the one first reference portion 58a is formed at a position to be aligned with a pin hole 20b (see FIG. 1) of the first arm 20 when the flange 12a is fastened to the first arm 20.

As mentioned above, the plurality of bolt-insertion holes 12b are formed in the flange 12a at even intervals in the circumferential direction of the flange 12a. Thus, as long as each of the bolt-insertion holes 12b is alignable with a respective one of the screw holes 20c of the first arms 20, a circumferential orientation of the outer cylinder 12 can be variously set with respect to the first arm 20. However, based on providing the first reference portion 58a, an orientation of the outer cylinder 12 about the axis O1 is fixed. Specifically, when the first reference portion 58a is aligned with the pin hole 20b formed in the first arm 20, the orientation of the outer cylinder 12 about the axis thereof is set to a given state with respect to the first arm 20. In this state, the outer cylinder 12 is fixedly attached to the first arm 20. Further, respective circumferential positions of the pin grooves 12c with respect to the first arm 20 are also set.

A pin (position adjustment member) 60 (see FIG. 1) may be inserted to extend between the first reference portion 58a and the pin hole 20b of the first arm 20 so as to reliably perform the position adjustment. After completion of the position adjustment, the pin 60 may be detached.

Alternatively, the bolt-insertion holes 12b formed in the flange 12a in the circumferential direction thereof may be intentionally arranged at uneven intervals so as to allow the circumferential orientation of the outer cylinder 12 with respect to the first arm 20 to be set only in a single way. In this case, the bolt-insertion holes 12b arranged at uneven intervals are used as the first reference portion 58a.

The second reference portion 58b is provided in the carrier 14 at a given position offset from the axis O1. In this embodiment, the second reference portion 58b is composed of a hole formed in the end face 32c of the base plate portion 32 of the carrier 14 on the side of the spur gears 44. More specifically, the second reference portion 58b is provided in the end face 32c of the base plate portion 32 which faces the second arm 38. The second reference portion 58b is provided in a number of one, wherein the one second reference portion 58b is formed at a position to be aligned with a pin hole 38b (see FIG. 1) of the second arm 38 when the base plate portion 32 of the carrier 14 is fastened to the second arm 38.

As mentioned above, the plurality of fastening holes 32d are formed in the base plate portions 32 in the circumferential direction thereof. Thus, as long as each of the fastening holes 32d is alignable with a respective one of the bolt-insertion hole 38a of the second arms 38, a circumferential orientation of the base plate portion 32 (carrier 14) can be variously set with respect to the second arm 38. However, based on providing the second reference portion 58b, an orientation of the base plate portion 32 (carrier 14) about the axis thereof is specified.

Figure 4:
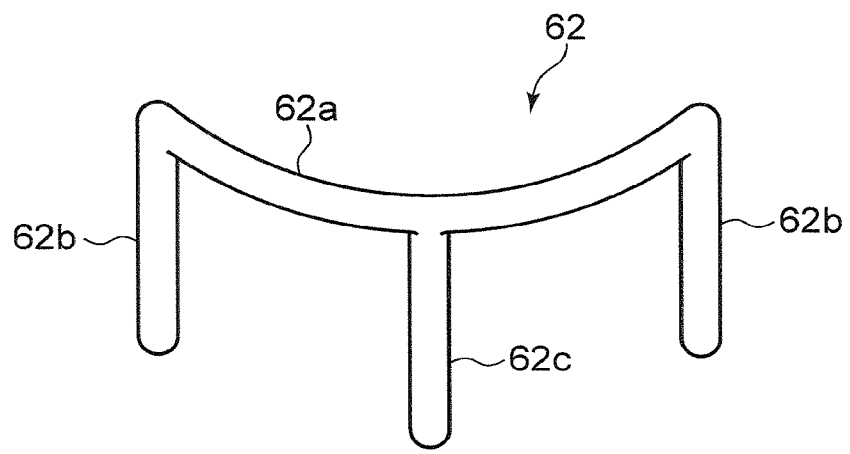
FIG. 4 is a perspective view of a temporary locking pin.

When the second reference portion 58b is aligned with the pin hole 38b formed in the second arm 38, the orientation of the carrier 14 about the axis thereof is set to a given state with respect to the second arm 38. In this state, the carrier 14 is fixedly attached to the second arm 38. A temporary locking pin 62 (see FIGS. 3 and 4) may be inserted to extend between the second reference portion 58b and the pin hole 38b of the second arm 38 so as to reliably perform the position adjustment. After the position adjustment is completed by fixedly attaching the carrier 14 to the second arm 38, the temporary locking pin 62 may be detached.

Alternatively, the fastening holes 32d formed in the base plate portion 32 in the circumferential direction thereof may be arranged in a specific pattern so as to allow the circumferential orientation of the base plate portion 32 (carrier 14) with respect to the second arm 38 to be set only in a single way. In this case, the fastening holes 32d formed in the base plate portion 32 are used as the second reference portion 58b.

The temporary locking pin 62 is formed as a three-forked pin which comprises a pin body 62a formed in an arc shape, legs 62b each extending from a respective one of opposite ends of the pin body 62a, and a leg 62c extending from an intermediate portion of the pin body 62a. The leg 62c extending from the intermediate portion is adapted to be insertable into the pin hole 38b of the second arm 38 and the second reference portion 58b of the carrier 14.

The third reference portion 58c is provided in the spur gear 44 at a given position offset from the crankshaft axis O2. The third reference portion 58c is provided in each of the three spur gears 44, wherein each of the third reference portions 58c is set at a position where it has a given directional relation with the eccentric directions of the first and second eccentric portions 46a, 46b with respect to the crankshaft axis O2 of the crankshaft 46. In other words, each of the third reference portions 58c has the same positional relationship with a corresponding one of the crankshaft axes 02. For example, the third reference portion 58c may be formed in a direction coinciding with the eccentric direction of the second eccentric portion 46b. Alternatively, as long as a positional relationship with each of the first and second eccentric portions 46a, 46b can be known, the third reference portion 58c may be formed at any position.

The third reference portion 58c is composed of a hole formed in the principal surface 44a of the spur gear 44. The principal surface 44a is exposed when the second arm 38 is detached. Specifically, the third reference portion 58c is provided in the surface 44a facing the second arm 38, as with the second reference portion 58b provided in the end face 32c of the base plate portion 32 of the carrier 14. One of the third reference portions 58c is provided in a respective one of the spur gears 44. Each of the legs 62b at the ends of the temporary locking pin 62 is adapted to be insertable into the third reference portion 58c under a condition that the middle leg 62c of the temporary locking pin 62 is inserted into the second reference portion 58b of the carrier 14 as mentioned above.

The temporary locking pin 62 is not limited to the three-forked type. For example, a two-forked temporary locking pin 62 formed by omitting one of the end legs 62b may be employed. In this case, one 62c of two legs of the temporary locking pin 62 is inserted into the second reference portion 58b, and the other leg 62b is inserted into the third reference portion 58c. Further, in this case, an additional temporary locking pin (illustration is omitted) may be used to, after positioning one of the three spur gears 44 (or crankshaft 46) with respect to the carrier 14, position the remaining two spur gears 44 (or two crankshafts 46) with respect to the positioned spur gear 44. In this case, the additional temporary locking pin may have a pin body 62a formed in a triangular shape to allow three legs thereof to be simultaneously inserted into respective ones of the third reference portions 58c.

Alternatively, a temporary locking pin (illustration is omitted) for positioning the second reference portion 58b with respect to the second arm 38, and a temporary locking pin (illustration is omitted) for positioning the spur gear 44 (crankshaft 46) with respect to the carrier 14, may be formed as separate pins. In this case, the temporary locking pin for positioning the carrier 14 with respect to the second arm 38 may be composed of a rod-like pin. This rod-like pin may be used without being detached.

An operation of the eccentric oscillating gear device 10 according to this embodiment will be briefly described below. In the gear device 10, the input shaft 16 is driven by driving force of the motor 22, and, according to a resulting rotation of the input shaft 16, the spur gears 44 are rotated through the drive gear 42. Thus, each of the crankshafts 46 is rotated together with a corresponding one of the spur gears 44. Upon rotation of the crankshaft 46, according to an oscillating movement of the first eccentric portion 46a, the first externally toothed gear 48a is rotated while being meshed with the internal teeth 24. Further, according to an oscillating movement of the second eccentric portion 46b, the second externally toothed gear 48b is rotated while being meshed with the internal teeth 24. Thus, the carrier 14 having the shaft portions 33 each penetrating through the second through-holes 48d of the first and second externally toothed gears 48a, 48b is rotated. Thus, the second arm 38 is relatively rotated with respect to the first arm 20. A rotation speed of the second arm 38 (carrier 14) has a value which is reduced at a given ratio with respect to a rotation speed input into the input shaft 16.

A reason for adjusting a rotational phase of the crankshaft 46 with respect to the outer cylinder 12 and the carrier 14 will be described below. FIG. 5A is a schematic diagram illustrating a positional relationship between respective ones of the first reference portion 58a representing a reference point of the outer cylinder 12, the second reference portion 58b representing a reference point of the carrier 14, and the third reference portion 58c representing a reference point of the crankshaft 46. FIG. 5B schematically illustrates a position of the first reference portion 58a on the first arm 20, and a position of the second reference portion 58b on the second arm 38. FIGS. 5A and 5B illustrate a state when the outer cylinder 12, the carrier 14, and each of the crankshafts 46, are set to a given orientation about the axis O1 with respect to the first arm 20, a given orientation about the axis O1 with respect to the second arm 38, and a given orientation about the crankshaft axis O2, respectively. The solid line illustrated in FIG. 5C indicates torsional rigidity in a rotation direction when the carrier 14 in the above state is rotated about the axis O1 relatively with respect to the outer cylinder 12. The torsional rigidity is periodically changed. This is caused, for example, by a difference in circumferential weight of the carrier 14 about the axis O1 (e.g., a difference in weight between portions with and without the through-holes 30c, 32b), and a difference in weight of the crankshaft 46 about the crankshaft axis O2.

FIG. 5D illustrates a state when the second reference portion 58b is displaced about the axis O1 from the position illustrated in FIG. 5A by about 30 degrees, and the third reference portion 58c is rotated about the crankshaft axis O2 with respect to the carrier 14. For example, FIG. 5D may be assumed to be in a state when the gear device assembled as illustrated in FIG. 5A is disassembled for maintenance or the like and then re-assembled.

The solid line in FIG. 5C indicates torsional rigidity occurring when the carrier 14 is rotated from the position illustrated in FIG. 5A, and the broken line in FIG. 5C indicates torsional rigidity occurring when the carrier 14 is rotated from the position illustrated in FIG. 5D. As is clear from FIG. 5C, the torsional rigidity becomes different between when an initial setting is performed in a coupled state between the first and second arms 20, 38 illustrated in FIG. 5A and when the initial setting is performed in a coupled state between the first and second arms 20, 38 illustrated in FIG. 5D, even if the second arm 38 is located at the same position with respect to the first arm 20. Thus, if a rotational position adjustment between respective ones of the five components: the first arm 20, the second arm 38, the outer cylinder 12, the carrier 14 and the crankshaft 46, is not performed, the torsional rigidity at an initial set position is changed, so that it is necessary to perform a fine adjustment by means of teaching. Therefore, the rotational phase adjustment between respective ones of the five components can be performed to reduce a variation in torsional rigidity. In the above description, the reason for a variation in torsional rigidity has been explained by taking a variation in orientation of the carrier 14 with respect to the outer cylinder 12 as an example. However, the variation in torsional rigidity is also caused by a difference in orientation (eccentric direction) of the crankshaft 46 with respect to the outer cylinder 12, and by a difference in orientation (eccentric direction) of the crankshaft 46 with respect to the carrier 14. Thus, it is necessary to adjust orientations between respective ones of the outer cylinder 12, the carrier 14 and the crankshaft 46.

A process of assembling the crankshaft 46 in the eccentric oscillating gear device 10 will be briefly described below. In the process of assembling the crankshaft 46, the crankshaft 46 provided with the first and second eccentric portions 46a, 46b and integrated with the spur gear 44 is first assembled to the carrier 14. In this assembling step, the temporary locking pin 62 is inserted into the second reference portion 58b and the third reference portion 58c to set an orientation of the crankshaft 46 about the axis thereof with respect to the carrier 14. In conjunction with the setting of the orientation of the crankshaft 46 with respect to the carrier 14, the carrier 14 may be positioned with respect to the second arm 38. Alternatively, the carrier 14 may be subsequently positioned with respect to the second arm 38.

Then, the carrier 14 is assembled to the outer cylinder 12. In this assembling step, the first reference portion 58a and the second reference portion 58b are used to set an orientation of the carrier 14 about the axis thereof with respect to the outer cylinder 12. In this case, a positional relationship between the first reference portion 58a and the second reference portion 58b may be set to a given state on a visual basis, or using a two-forked temporary locking pin. Thus, an orientation of the crankshaft 46 about the crankshaft axis O2 is set on the basis of the orientations of the outer cylinder 12 and the carrier 14 about the axis O1. Then, the first arm 20 and the second arm 38 are fastened to the gear device using the pin 60 and the temporary locking pin 62. This makes it possible to establish a coupled state between the first and second arms 20, 38 under a condition that the orientation of the outer cylinder 12 with respect to the first arm 20, the orientation of the carrier 14 with respect to the second arm 38, and the orientation of the crankshaft 46 with respect to the outer cylinder 12 and the carrier 14, are set.

As described above, the eccentric oscillating gear device according to the above embodiment is capable of setting an orientation of the crankshaft 46 about the axis thereof, on the basis of orientations of the outer cylinder 12 and the carrier 14 about the axis thereof. Thus, when the outer cylinder 12 and the carrier 14 are attached, respectively, to the first arm 20 and the second arm 38, an orientation of the crankshaft 46 with respect to the first arm 20 and the second arm 38 can be set through the orientations of the outer cylinder 12 and the carrier 14. In other words, the orientation of the crankshaft 46 can be set using the rotational phase adjusting means. Thus, in cases where the gear device 10 is disassembled during maintenance or the like and then re-assembled, it becomes possible to prevent a phase of torsional rigidity in a rotation direction from being changed from that before the disassembling. Further, it becomes possible to prevent an individual difference in phase of the torsional rigidity in the rotation direction from occurring between respective ones of a plurality of the gear devices 10.

In the above embodiment, in an operation of assembling the crankshaft 46, the crankshaft 46 is assembled to allow the third reference portion 58c to be set to a given position on the basis of the first reference portion 58a and the second reference portion 58b. Thus, the crankshaft 46 can be assembled such that an orientation thereof is set to a given state on the basis of the orientations of the outer cylinder 12 and the carrier 14 about the axis thereof.

In the above embodiment, during assembling of the crankshaft 46, a two-forked or three-forked temporary locking pin 62 is inserted to extend between the second reference portion 58b and the third reference portion 58c each composed of a hole, so that it becomes possible to reliably set an orientation of the crankshaft 46 with respect to the carrier 14. When the temporary locking pin 62 is subsequently detached, an eccentric oscillating gear device 10 can be provided in which the crankshaft 46 is assembled to the carrier 14 under a condition that the orientation of the crankshaft 46 is adjusted to a given state.

The present invention is not limited to the above embodiment, but various changes and modifications may be made therein without departing from the spirits and scope of the present invention. For example, although the above embodiment has been described based on an example where each of the first, second and third reference portions 58a, 58b, 58c is composed of a hole, the present invention is not limited thereto. For example, at least one of the first, second and third reference portions 58a, 58b, 58c may be composed of a mark discriminable from its surroundings, based on color, convexity or concavity.

Although the gear device according to the above embodiment is designed such that the third reference portion 58c is provided in the spur gear 44, the present invention is not limited thereto. For example, the third reference portion 58c may be provided in any other suitable portion viewable from the side of the second arm 38, such as an end face of the crankshaft 46 on the side of the second arm 38. Alternatively, the third reference portion 58c may be provided in any other suitable portion viewable from the side of the first arm 20, such as an end face of the crankshaft 46 on the side of the first arm 20.

The gear device according to the above embodiment is designed such that the spur gear 44 is joined to the end of the crankshaft 46. Alternatively, the spur gear 44 may be disposed between the first eccentric portion 46a and the second eccentric portion 46b. In this case, the third reference portion 58c may be provided in an end face of the crankshaft 46 or an end face of the second eccentric portion 46b, as well as the one principal surface 44a of the spur gear 44.

Although the gear device according to the above embodiment is designed such that the plurality of crankshafts 46 are arranged at positions offset from the axis O1 of the outer cylinder 12 at even intervals in the circumferential direction, the present invention is not limited thereto. For example, a so-called "center crank mechanism" may be employed in which a single crankshaft 46 is disposed in concentric relation with the outer cylinder 12 and the carrier 14. In this case, the third reference portion 58c may be provided in a spur gear joined to the crankshaft 46. Further, in a structure where a spur gear is omitted, the third reference portion 58c may be formed in a distal end face of the crankshaft 46.

In the above embodiment, in an operation of adjusting a rotational phase of the gear device 10, the temporary locking pin 62 is inserted into the second reference portion 58b provided in the carrier 14, the third reference portion 58c provided in the spur gear 44 and the pin hole 38b provided in the second arm 38 to adjust the rotational phase. Alternatively, the rotational phase of the gear device 10 may be adjusted before the assembling to the second arm 38. For example, the temporary locking pin 62 is inserted into the second reference portion 58b and the third reference portion 58c from the side of one end (in FIG. 1, a left end) of the gear device 10 to adjust rotational phases of the carrier 14 and the crankshaft 46. In this state, the gear device 10 is assembled to the first arm 20 while adjusting the rotational phase thereof using the first reference portion 58a. Then, the motor 22 is attached to the first arm 20 from the side of the other end (in FIG. 1, a right end) of the gear device 10, and the drive gear 42 of the input shaft 16 is meshed with the spur gear 44. Then, the motor is powered on to allow a reference rotational phase to be recognized by a servo lock function, a brake attached to the motor or the like, and fixed. Then, the temporary locking pin is detached from the gear device. Even if the temporary locking pin is detached, the carrier 14 and the crankshaft 46 are kept from rotating, for example, by the servo lock function. Finally, the gear device 10 is attached to the second arm 38 while adjusting respective positions of the second arm 38 and the first arm 20.

Although the above embodiment has been described based on a structure comprising the outer cylinder 12 provided with the internal teeth 24, and the first and second externally toothed gears 48a, 48b, the present invention is not limited thereto. For example, a structure may be employed which comprises a carrier provided with external teeth, and an internally toothed gear. This type of gear device is disclosed, for example, in JP 2000-065158A. Specifically, a carrier serving as the second cylindrical section is disposed coaxially with an outer cylinder serving as the first cylindrical section, while being partially located radially inward of the outer cylinder. The carrier has an outer peripheral surface provided with external teeth at a position radially inward of the outer cylinder. No tooth portion is provided on an inner peripheral surface of the outer cylinder. Further, a ring-shaped gear member having an inner peripheral surface provided with internal teeth meshable with the external teeth of the carrier is disposed between the carrier and the outer cylinder. The gear member is formed with a through-hole for allowing an eccentric portion of a crankshaft to be fitted therein. The crankshaft is rotated while receiving a torque from an input shaft directly or through a spur gear. The crankshaft is circumferentially provided in a number of two or more, wherein each of the crankshafts is rotatably supported by the outer cylinder, and the gear member is adapted to be oscillated according to a rotation of the crankshaft. Thus, the carrier having the external teeth meshed with the internal teeth of the gear member is rotated. Further, a second arm joined to the carrier can be relatively rotated with respect to a first arm joined to the outer cylinder. In this structure, the outer cylinder is formed with a first reference portion (e.g., a hole) for setting an orientation of the outer cylinder about an axis thereof with respect to the first arm, and the carrier is formed with a second reference portion (e.g., a hole) for setting an orientation of the carrier about an axis thereof with respect to the second arm. Further, the crankshaft or the spur gear is formed with a third reference portion (e.g., a hole) for setting an orientation of the crankshaft.

In the above embodiment, the outer cylinder is formed to serve as an example of the first cylindrical section, and the carrier is formed to serve as an example of the second cylindrical section. Alternatively, the carrier may be formed to serve as an example of the first cylindrical section, and the outer cylinder may be formed to serve as an example of the second cylindrical section.

An outline of the above embodiment will be described below.

(1) The eccentric oscillating gear device according to the above embodiment is provided with rotational phase adjusting means for setting an orientation of the crankshaft about an axis thereof, on the basis of orientations of the first and second cylindrical sections about an axis thereof. This makes it possible to set the orientation of the crankshaft about the axis thereof, on the basis of the orientations of the first and second cylindrical sections about the axis thereof. Thus, when the first cylindrical section and the second cylindrical section are attached, respectively, to a first member and a second member, an orientation of the crankshaft with respect to the first member and the second member can be set through the orientations of the first and second cylindrical sections. Thus, in cases where the gear device is disassembled during maintenance or the like and then re-assembled, it becomes possible to prevent a phase of torsional rigidity in a rotation direction from being changed from that before the disassembling. Further, it becomes possible to prevent an individual difference in phase of the torsional rigidity in the rotation direction from occurring between respective ones of a plurality of the gear devices.

(2) Preferably, the rotational phase adjusting means has a first reference portion provided in the first cylindrical section at a given position offset from the axis thereof, a second reference portion provided in the second cylindrical section at a given position offset from the axis thereof, and a third reference portion provided in the crankshaft or in a spur gear joined to the crankshaft, at a given position offset from the axis of the crankshaft.

According to this feature, in an operation of assembling the crankshaft, the crankshaft is assembled to allow the third reference portion to be set to a given position on the basis of the first reference portion and the second reference portion, so that the crankshaft can be assembled such that an orientation thereof is set to a given state on the basis of the orientations of the first and second cylindrical sections about the axis thereof.

(3) Each of the second and third reference portion may be formed as a hole.

According to this feature, during assembling of the crankshaft, a two-forked or three-forked temporary locking pin is inserted to extend between the second reference portion and the third reference portion each composed of a hole, so that it becomes possible to reliably set an orientation of the crankshaft with respect to the carrier. When the temporary locking pin is subsequently detached, an eccentric oscillating gear device can be provided in which the crankshaft is assembled to the first or second cylindrical section under a condition that the orientation of the crankshaft is adjusted to a given state.

(4) The crankshaft may be provided in a number of one. In this case, the one crankshaft may be disposed in concentric relation with respect to the first or second cylindrical section.

(5) The crankshaft may be provided in a number of two or more. In this case, the two or more crankshafts may be disposed about the axis of the first or second cylindrical section at even intervals.

(6) One of the first and second cylindrical sections may be a carrier, and a remaining one of the first and second cylindrical sections may be an outer cylinder having internal teeth. In this case, the gear member may be an externally toothed gear meshed with the internal teeth of the outer cylinder.

(7) One of the first and second cylindrical sections may be an outer cylinder, and a remaining one of the first and second cylindrical sections may be a carrier having external teeth. In this case, the gear member may be an internally toothed gear meshed with the external teeth of the carrier.

As mentioned above, the eccentric oscillating gear device according to the above embodiment is capable of reducing a variation in torsional rigidity in a rotation direction.

What is claimed is:
1. A robot, comprising
a first member,
a second member,
a speed reducer having an externally toothed gear and internal teeth for use in an articulated joint between the first member and the second member to transmit driving force while changing a rotation speed at a given rotation speed ratio, in which the externally toothed gear is rotated inside of the internal teeth while being meshed with the internal teeth, and a rotational phase adjuster for adjusting rotational phase of the speed reducer so that the rotational phase of the speed reducer after being reassembled is prevented from changing from a rotational phase of the speed reducer before disassembling when the speed reducer is disassembled and then reassembled in a state where an orientation of the second member with respect to an orientation of the first member is set to a given orientation.

2. The robot as defined in claim 1, wherein the rotational phase adjuster has a reference portion for adjusting relative rotational phase of the externally toothed gear of the speed reducer with respect to orientations of the first member and the second member to a given rotational phase.

3. The robot as defined in claim 1, wherein the speed reducer includes a first cylindrical section adapted to be attached to the first member and a second cylindrical section adapted to be attached to the second member and adapted to rotate relatively with respect to the first cylindrical section, and wherein the rotational phase adjuster includes a first pin hole formed in the first member, a second pin hole formed in the second member, a first reference portion provided in the first cylindrical section of the speed reducer and a second reference portion provided in the second cylindrical section of the speed reducer.

4. The robot as defined in claim 3, wherein a relative rotational phase of the first cylindrical section of the speed reducer with respect to the first member is adjusted to a given rotational phase by the first reference portion engaged with the first pin hole, and wherein a relative rotational phase of the second cylindrical section of the speed reducer with respect to the second member is adjusted to a given rotational phase by the second reference portion engaged with the second pin hole.

5. The robot as defined in claim 3, wherein the first pin hole is formed in a surface of the first member to which the first cylindrical section is fixedly attached, the first reference portion is provided in the first cylindrical section to which the first member is fixedly attached, the second pin hole is formed in a surface of the second member to which the second cylindrical section is fixedly attached, and the second reference portion is provided in the second cylindrical section to which the second member is fixedly attached.

6. The robot as defined in claim 4, wherein the first pin hole is formed in a surface of the first member to which the first cylindrical section is fixedly attached, the first reference portion is provided in the first cylindrical section to which the first member is fixedly attached, the second pin hole is formed in a surface of the second member to which the second cylindrical section is fixedly attached, and the second reference portion is provided in the second cylindrical section to which the second member is fixedly attached.

7. A robot group, comprising a plurality of robots, each of the plurality of robots having:

a first member, a second member, a speed reducer having an externally toothed gear and internal teeth for use in an articulated joint between the first member and the second member to transmit driving force while changing a rotation speed at a given rotation speed ratio, the externally toothed gear being rotated inside of the internal teeth while being meshed with the internal teeth, and a rotational phase adjuster capable of adjusting rotational phase of the speed reducer so that rotational phases of speed reducers between respective speed reducers of the plurality of robots are prevented from causing a difference of the rotational phases of the speed reducers between the plurality of robots when the speed reducers are assembled in the respective robots in a state where an orientation of the second member with respect to an orientation of the first member is set to a given orientation.

* * * * *